US011092065B2

(12) United States Patent
Sheidler et al.

(10) Patent No.: US 11,092,065 B2
(45) Date of Patent: Aug. 17, 2021

(54) ENGINE AIR PRECLEANER SYSTEM

(71) Applicant: DEERE & COMPANY, Moline, IL (US)

(72) Inventors: Alan D. Sheidler, Moline, IL (US); Garrick W. Herbst, Bettendorf, IA (US); Todd E. Van Hal, Eldridge, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/394,458

(22) Filed: Apr. 25, 2019

(65) Prior Publication Data

US 2020/0340390 A1   Oct. 29, 2020

(51) Int. Cl.
*B60K 11/02* (2006.01)
*B01D 46/10* (2006.01)
(Continued)

(52) U.S. Cl.
CPC .......... *F01P 11/12* (2013.01); *B01D 46/0023* (2013.01); *B01D 46/0042* (2013.01); *B01D 46/0046* (2013.01); *B01D 46/0071* (2013.01); *B01D 46/10* (2013.01); *B60K 11/02* (2013.01); *F01P 3/18* (2013.01); *F01P 5/06* (2013.01); *F01P 7/02* (2013.01); *F01P 11/10* (2013.01); *F02M 35/0201* (2013.01);
(Continued)

(58) Field of Classification Search
CPC .... F01P 11/12; F01P 11/10; F01P 3/18; F01P 5/06; F01P 7/02; F02P 35/0201; F02P 35/0216; F02P 35/02466; F02P 35/042; F02P 35/086; F02P 35/164; B01D 46/0023; B01D 46/0042; B01D 46/0046; B01D 46/0071; B01D 46/10; B60K 11/02; F02M 35/0201; F02M 35/0216; F02M 35/02466; F02M 35/042; F02M 35/086; F02M 35/164
USPC ............................. 180/68.1, 68.2, 68.3, 68.4
See application file for complete search history.

(56) References Cited

U.S. PATENT DOCUMENTS 3,155,473 A * 11/1964 McNeil .................... F01P 11/12
55/294
3,630,003 A   12/1971 Ashton et al.
(Continued)

FOREIGN PATENT DOCUMENTS

JP   4073367 B2   4/2008
JP   4485810 B2   6/2010

OTHER PUBLICATIONS

Vogele Mini Class Super 800-3i Tracked Paver Brochure, A Wirtgen Group Company, pp. 1-18, published Feb. 2018.
(Continued)

*Primary Examiner* — John D Walters
(74) *Attorney, Agent, or Firm* — Taft Stettinius & Hollister LLP; Stephen F. Rost (57) ABSTRACT

An air management assembly for a work machine, the air management assembly having a cooling orifice defined in a panel, a cooling fan generating a cooling airflow through the cooling orifice to a cooling package, at least one fixed screen positioned along an intake orifice, and a first baffle positioned at least partially between the cooling orifice and the intake orifice. Wherein, the first baffle directs the cooling airflow partially across the fixed screen to clear the fixed screen of debris.

20 Claims, 6 Drawing Sheets

(51) Int. Cl.
    *F01P 11/10*         (2006.01)
    *F01P 11/12*         (2006.01)
    *B01D 46/00*       (2006.01)
    *F01P 5/06*          (2006.01)
    *F01P 7/02*          (2006.01)
    *F01P 3/18*          (2006.01)
    *F02M 35/02*       (2006.01)
    *F02M 35/024*      (2006.01)
    *F02M 35/04*       (2006.01)
    *F02M 35/08*       (2006.01)
    *F02M 35/16*       (2006.01)

(52) U.S. Cl.
    CPC .. *F02M 35/0216* (2013.01); *F02M 35/02466* (2013.01); *F02M 35/042* (2013.01); *F02M 35/086* (2013.01); *F02M 35/164* (2013.01); *B01D 2279/60* (2013.01); *F01P 2070/52* (2013.01)

(56) References Cited

U.S. PATENT DOCUMENTS

| | | | |
|---|---|---|---|
| 4,233,040 A | | 11/1980 | Vogelaar et al. |
| 4,339,014 A | * | 7/1982 | Berth ............ B60K 11/08 |
| | | | 180/68.1 |
| 2006/0283157 A1 | * | 12/2006 | Keys, II ......... B01D 46/0056 |
| | | | 55/290 |
| 2010/0001241 A1 | | 1/2010 | Rentschler |
| 2013/0092462 A1 | | 4/2013 | Chinta |
| 2019/0093608 A1 | * | 3/2019 | Shonk ............ F02M 35/10268 |

OTHER PUBLICATIONS

Hamm Raco 350 Soil Stabilizer Used, https://www.ito-germany.com/hamm-raco-350-used, publicly available as early as Feb. 26, 2019.

Retrade Surplus Management, https://www.retrade.eu/en/aitem/409943/REMIXER_SOIL_STABILIZER, Jan. 26, 2017.

* cited by examiner

ENGINE AIR PRECLEANER SYSTEM

FIELD OF THE DISCLOSURE

The present disclosure related to an air management assembly and more specifically to an air management assembly with a baffle.

BACKGROUND

Agricultural and construction vehicles are often powered by internal combustion engines. Typically, these vehicles are used in environments that are dirty, and the air contains dust and other particulate matter or debris. For example, agricultural vehicles work in environments where crop residue, as well as dirt and particulate matter, are in the air. During operation, air is drawn into the engine compartment for cooling the engine and for efficient combustion in the internal combustion engine. For proper combustion and to reduce unnecessary wear on the engine, the air supply must be substantially free of particulate matter.

In harvesting or construction environments, this generally requires an air filtration or cleaning system so the air used by the vehicle for combustion or cooling is sufficiently free of debris. Even with conventional cleaning systems, particulate matter, dirt, and crop residue can block, or partially block, the air intake systems. As a result, the system often needs to be cleaned at frequent intervals.

SUMMARY

One embodiment is an air management assembly for a work machine that has a cooling orifice defined in a panel, a cooling fan generating a cooling airflow through the cooling orifice to a cooling package, at least one fixed screen positioned along an intake orifice, and a first baffle positioned at least partially between the cooling orifice and the intake orifice. Wherein, the first baffle directs the cooling airflow partially across the fixed screen to clear the fixed screen of debris.

In one example of this embodiment the first baffle defines a first inlet and a first outlet, the first inlet being oriented in a substantially vertical direction. In one aspect of this example the first outlet directs air towards the cooling orifice. In another aspect of this example the fixed screen is at least partially positioned between the first inlet and the first outlet.

Another example has a rotary screen substantially covering the cooling orifice and an air scoop that partially directs the cooling airflow into the cooling orifice. In one aspect of this example the air scoop has a cutout portion and at least a portion of the rotary screen is not horizontally obstructed by the air scoop from a surrounding environment. Another aspect of this example has a louver assembly coupled to the air scoop. Further, the louver assembly is pivotable about a pivot axis.

Yet another example has a second baffle wherein the second baffle defines a second inlet and a second outlet, the second inlet being oriented in a substantially vertical direction.

Another embodiment is an air management assembly for a work machine that has cooling assembly having a cooling package and defining a cooling orifice, the cooling assembly configured to direct air from a surrounding environment through the cooling orifice to cool the cooling package, an air scoop assembly that directs air from the surrounding environment through the cooling orifice, a first baffle defined in the air scoop assembly to direct air from the surrounding environment into the cooling orifice along a first path, and an intake orifice defined in the air scoop assembly at least partially along the first baffle. Wherein, air from the surrounding environment enters the cooling orifice along the first path through the first baffle and through a second path that is not through the first baffle.

One example of this embodiment has a screen over the intake orifice, wherein the first path is directed at least partially over the screen to thereby remove debris from the screen as air flows in the first path towards the cooling orifice. In another example the air scoop assembly further defines a second baffle that provides air flow from the surrounding environment to the cooling orifice along a third path. One aspect of this example has a second orifice having a second screen wherein the second orifice and screen are positioned at least partially along the third path. In another aspect of this example the first baffle has a first inlet and the second baffle has a second inlet wherein the first and second inlets are substantially facing a vertical direction. In part of this aspect, the first baffle has a first outlet and the second baffle has a second outlet, the first and second outlets being defined in a pocket portion of the air scoop assembly.

In another example, the air scoop assembly has a louver assembly coupled thereto wherein the louver assembly partially defines the second path. In one aspect of this example, the louver assembly is pivotable about a pivot axis between a first orientation and a second orientation.

Yet another embodiment is a work machine that has a body, at least one ground engaging mechanism, an engine that selectively powers the ground engaging mechanism, the engine fluidly coupled to an engine intake orifice to provide air to the engine to assist with the combustion of fuel, a radiator fluidly coupled to at least one fluid system of the work machine to cool fluids used by the fluid system, a cooling fan that draws air from a surrounding environment through a cooling orifice past the radiator, an air scoop assembly positioned at least partially around the cooling orifice and that directs air from the surrounding environment through the cooling orifice, and a first baffle defined in the air scoop assembly to direct air from the surrounding environment into the cooling orifice along a first path. Wherein, the engine intake orifice is defined in the air scoop assembly at least partially along the first baffle. Further wherein, the cooling fan draws air from the surrounding environment through the air scoop assembly along the first path through the first baffle and through a second path that is not through the first baffle.

In one example of this embodiment, the air scoop assembly further defines a second baffle that provides air flow from the surrounding environment to the cooling orifice along a third path. Wherein, the first baffle has a first inlet and the second baffle has a second inlet and the first and second inlets are substantially facing a vertical direction. In one aspect of this example, the air scoop assembly has a louver assembly coupled thereto and positioned between the first and second baffle, wherein the louver assembly partially defines the second path and the louver assembly is pivotable about a pivot axis between a first orientation and a second orientation.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
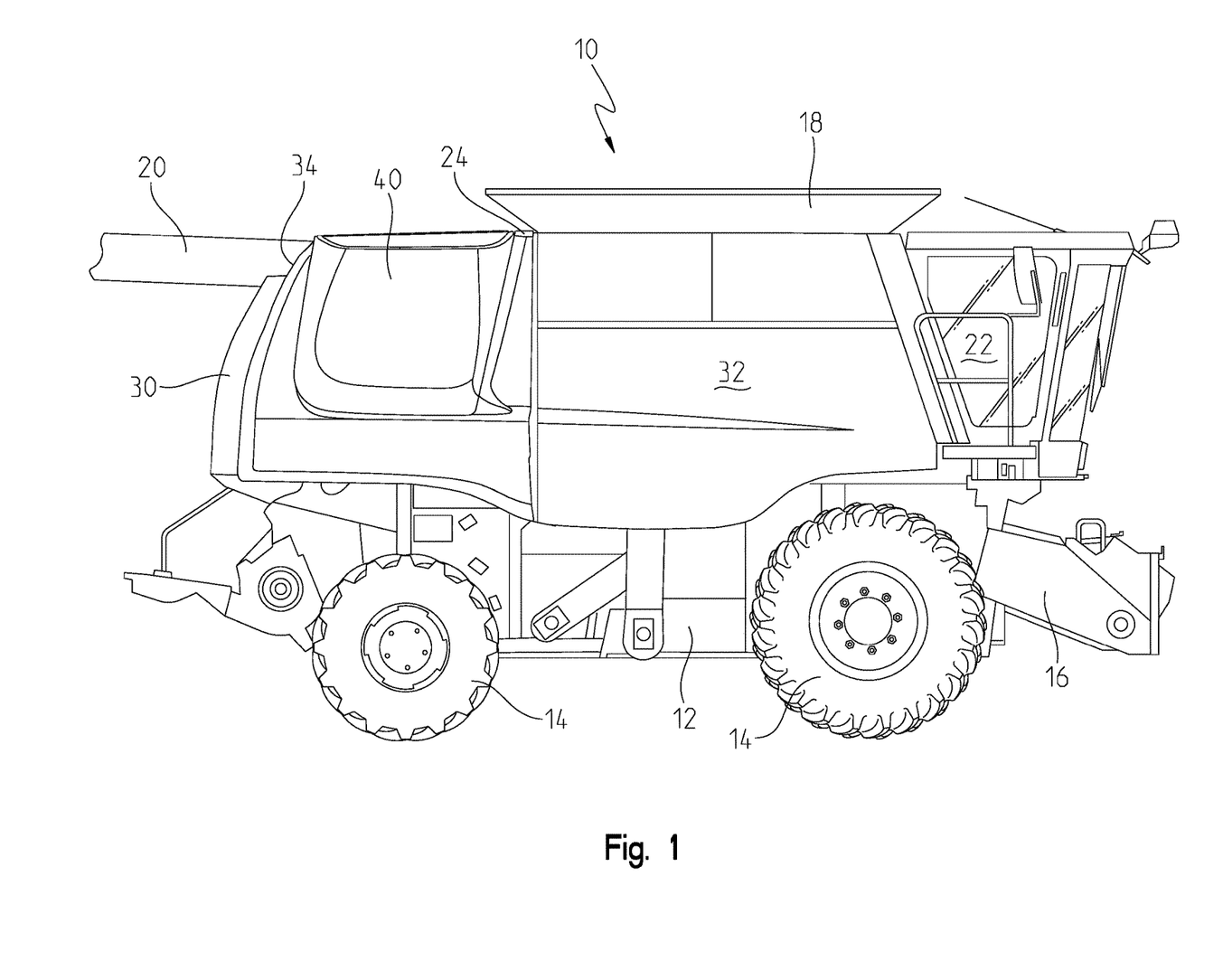
FIG. 1 is a side view of an agricultural combine having an air scoop.

Referring now to the drawings, and more particularly to FIG. 1, there is shown a working vehicle in the form of an agricultural harvesting machine, such as an agricultural combine 10. The working vehicle can also be in the form of a different type of vehicle used in a dirty or debris-laden operating environment, such as an agricultural tractor, construction equipment, forestry equipment, and the like. Combine 10 may include a supporting structure or body 12 having ground engaging mechanisms 14 extending from body 12. Although combine 10 is illustrated as having wheels 14, it could also have ground engaging tracks, either full tracks or half-tracks. The combine 12 also has a feeder house 16 through which harvested crop material is fed into the combine 10 for processing. Once processed, the harvested crop material is stored in a grain tank 18 in the combine 10 and unloaded from the combine 10 through an unloading auger 20. The operation of combine 10 is controlled from an operator's cab 22.

Mechanical power for combine 10 is provided by an internal combustion engine contained in an engine compartment 24 in the rear portion of the combine 12. A radiator in the engine compartment 24 is used for circulating cooling fluid through the internal combustion engine. The combine 10 has a number of body panels surrounding the sides and rear of the combine, including, but not limited to a rear panel 30, left side panels, right side panel 32, and radiator door panel 34, adjacent to the area of the engine compartment 24 where the radiator is located, the radiator door panel 34 having an air scoop 40.

Figure 2A:
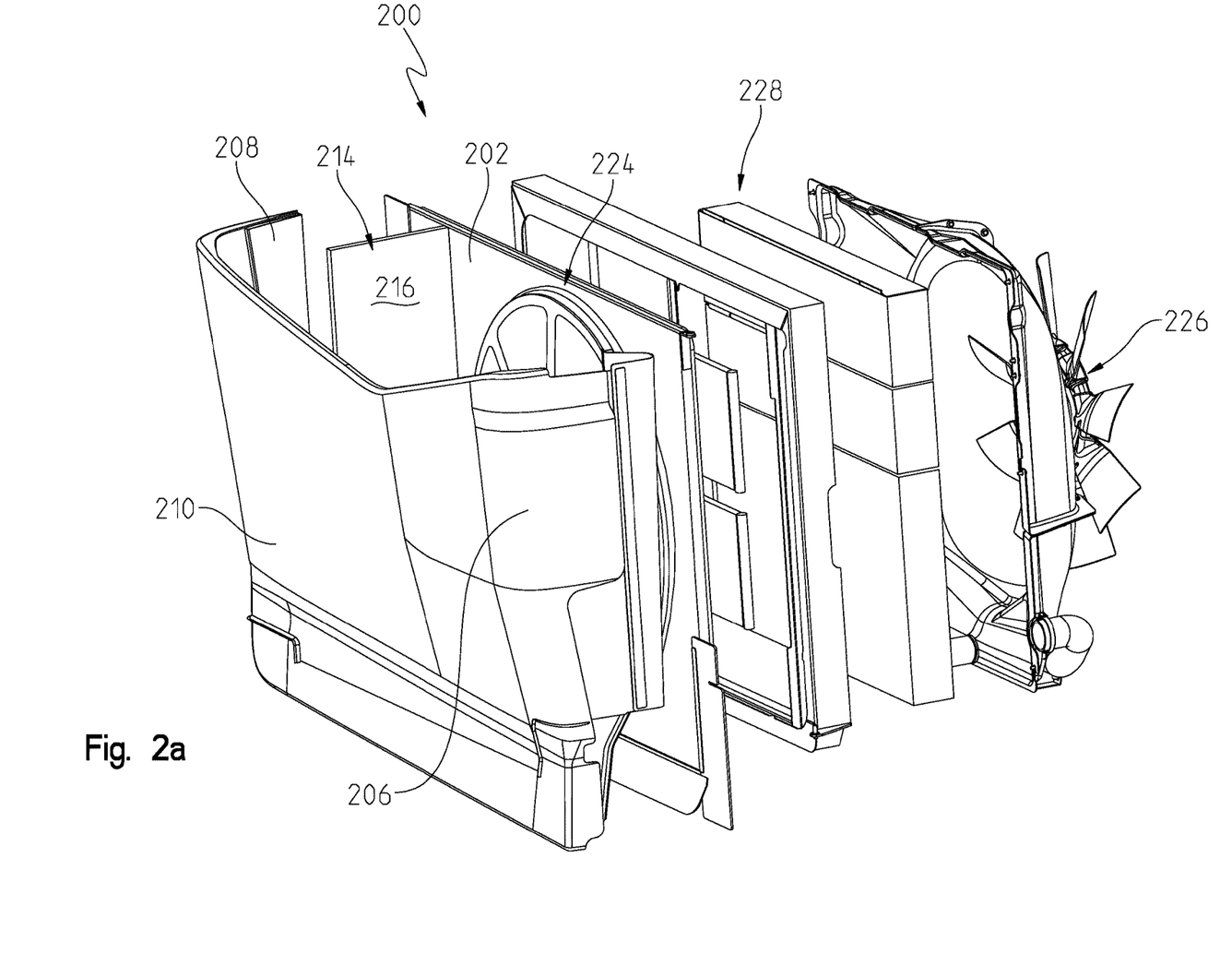
FIG. 2a is a an elevated perspective view of an exploded air scoop assembly.
Figure 2B:
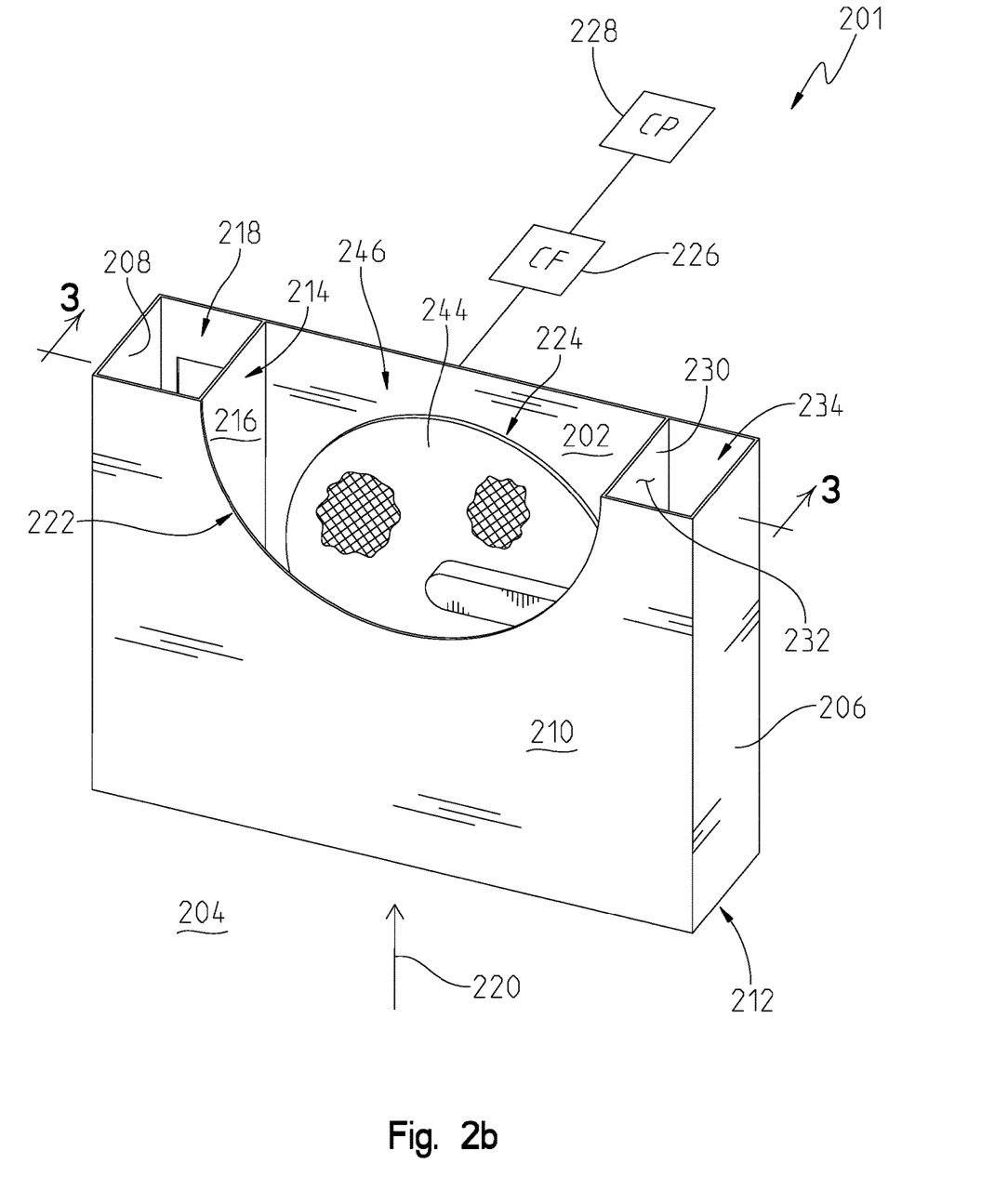
FIG. 2b is an elevated perspective view of another embodiment of an air scoop assembly separated from the combine.

Referring now to FIGS. 2a and 2b, two embodiments for an air scoop assembly 200 (FIG. 2a), 201 (FIG. 2b) are illustrated isolated from the combine 10. Further, air scoop assembly 200 is illustrated in exploded form with several components spaced from one another. While the air scoop assemblies 200, 201 are described herein with reference to a combine 10, this disclosure contemplates utilizing the embodiments discussed herein for any type of work machine. More specifically, the embodiments discussed herein may also be applied to work machines in construction and forestry as well to give a couple of non-exclusive examples of additional applications. Further, while the air scoop assemblies 200, 201 may have some structural differences, common components will be referred to utilizing the same reference number.

Either embodiment 200, 201 may have a first panel 202 positioned along a work machine side of the of the corresponding air scoop assembly 200, 201. The first panel 202 may be one or more panels of the combine 10 discussed herein or may be a separate panel that is coupled to the right side panel 32 or the radiator door panel 34. Further, the first panel 202 may be any structure that defines an orifice that fluidly couples components of the combine 10 to a surrounding environment 204. The surrounding environment 204 may be the air and debris surrounding the combine 10.

The air scoop assembly 201 may also have a first and second side panel 206, 208 and a bottom panel 212 extending from the first panel 202 away from the combine 10. Further, an outer panel 210 may be coupled to the side panels 206, 208 and the bottom panel 212 to generally form a pocket there between. In other words, the panels 202, 206, 208, 210, 212 may be coupled to one another to control the areas of the air scoop assembly 201 that permits air and other debris from the surrounding environment 204 to enter the engine and engine compartment 24 among other spaces.

While the air scoop assembly 201 is described as being formed from panels 202, 206, 208, 210, 212, other embodiments contemplated herein, such as the air scoop assembly 200, may utilize formed material to build the air scoop assembly 200. In one non-exclusive example, part or all of the air scoop assembly 200 may be formed of plastic, fiberglass, carbon fiber, or the like and be formed of curved interchanges rather than panels defined at substantially right angles relative to one another as illustrated for the air scoop assembly 201 of FIG. 2b.

The air scoop assembly 200, 201 may be positioned along a cooling orifice 224 defined in the first panel 202. The cooling orifice 224 may be a through hole in the first panel 202 that allows air to enter the engine compartment 24 and other spaces to allow the combine 10 to function as intended. More specifically, air may be drawn through the air scoop assembly and cooling orifice 224 with a cooling fan 226 or the like. The cooling fan 226 may draw air through the air scoop assembly 200 and the cooling orifice 224 and over a cooling package 228 among other things. The cooling fan 226 may be positioned in front of, or behind, the cooling package 228. Further, the cooling package 228 may have one or more radiator positioned therein to cool fluids utilized by the combine 10. In one non-exclusive example, the cooling package 228 may have radiators to facilitate cooling of engine oil, hydraulic fluid, engine charge air, and engine coolant among other things.

In one aspect of this disclosure, the air scoop assembly 200, 201 has a first baffle 214 defined therein to define a first path 302 (see FIG. 3) for air entering the air scoop assembly 200, 201 from the surrounding environment 204. More specifically, the first baffle 214 may be defined by a first baffle wall 216 that extends from the first panel 202 to the outer panel 210. The first baffle 214 may define a first inlet 218 at an uppermost portion of the first baffle 214 and oriented with the opening facing a vertical direction 220. The first inlet 218 may generally be oriented in the vertical direction 220 so the air entering the first baffle 214 from the surrounding environment 204 is pulled from an upper portion of the air scoop assembly 200, 201. In the exploded view of the air scoop assembly 200 of FIG. 2a, the baffle wall 216 is illustrated spaced from the outer panel 210. However, in the assembled configurations the baffle wall 216 extends to the outer panel 210 to define the first path 302 discussed herein.

In another aspect of this disclosure, the air scoop assembly 201 may have a second baffle 230 defined therein to define a third path 304 (see FIG. 3) for air entering the air scoop assembly 201 from the surrounding environment 204. More specifically, the second baffle 230 may be defined by a second baffle wall 232 that extends from the first panel 202 to the outer panel 210. The second baffle 230 may define a second inlet 234 at an uppermost portion of the second baffle 230 and oriented towards the vertical direction 220. The second inlet 234 may generally be oriented in the vertical direction 220 so the air entering the second baffle 230 from the surrounding environment 204 is pulled from an upper portion of the air scoop assembly 201.

While both a first and second baffle 214, 230 are illustrated in FIG. 2b, this disclosure contemplates utilizing only one of the first or second baffles 214, 230 as well. For example, the air scoop assembly 200 may not have the second baffle 230 at all. Alternatively, in the embodiment of FIG. 2b, there may be no first baffle 214 at all and the air scoop assembly 201 may only have a second baffle 230. Further still, other embodiments considered herein have more than two baffles. Accordingly, this disclosure contemplates varying the baffle location and number.

Figure 3:
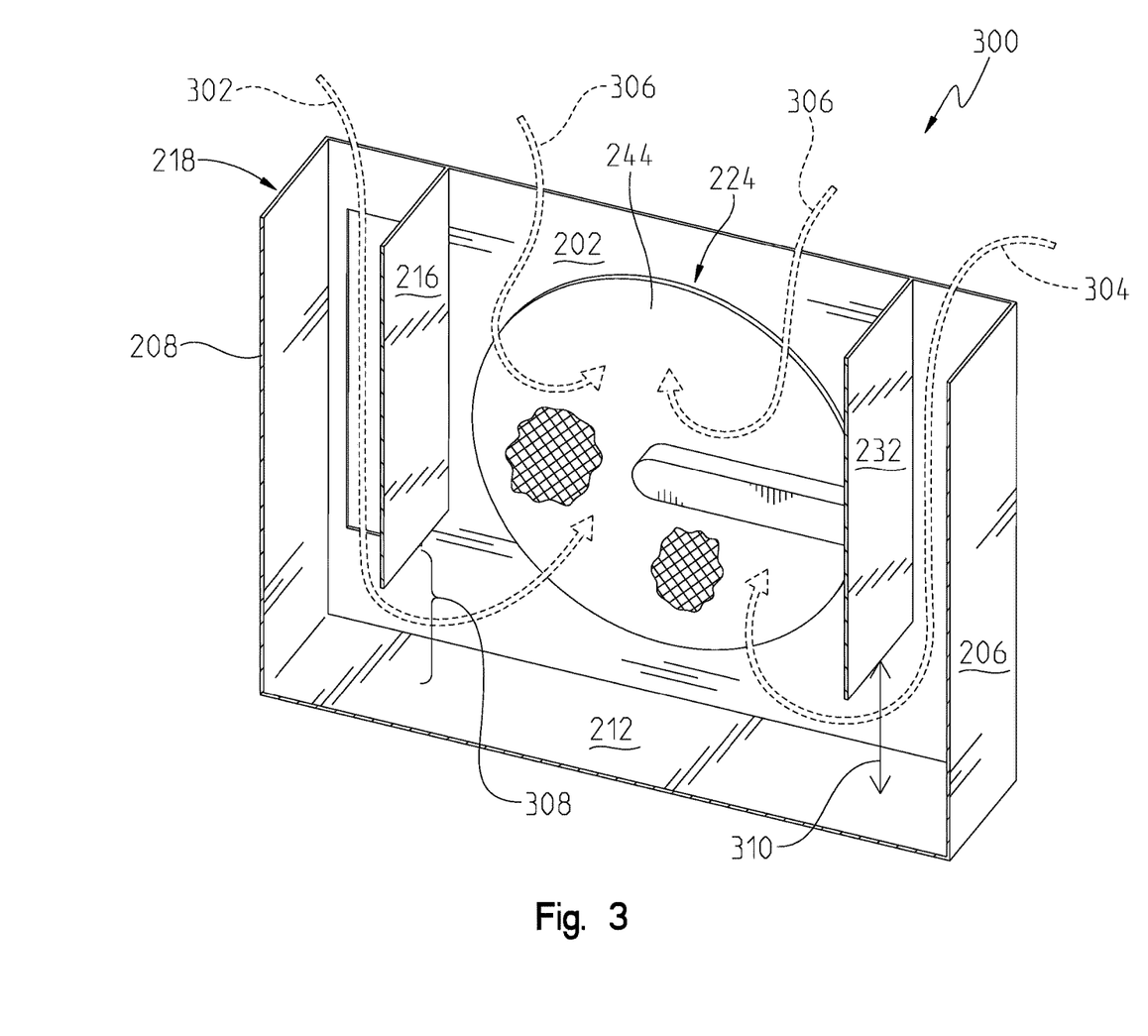
FIG. 3 is an elevated side view of the air scoop assembly of FIG. 2b with an outer panel removed.

Referring now to FIG. 3, a section view 300 of the air scoop assembly 201 is illustrated with the outer panel 210 removed. More specifically, the air paths 302, 304, 306 of the air scoop assembly 201 are illustrated in FIG. 3. The air paths 302, 304, 306 are generally intended to illustrate the basic flow path of fluid from the surrounding environment 204 into the cooling orifice 224 as the cooling fan 226 draws air there through. More specifically, the first path 302 may flow through the first inlet 218 and into a passageway of the first baffle 214. The first path 302 may flow downward towards the bottom panel 212 until it reaches a first outlet 308 defined, in part, by a space between the baffle wall 216 and the bottom panel 212. The first path 302 may then flow through a rotary screen 244 and into the cooling orifice 224.

Air and surrounding debris may also enter the air scoop assembly 201 from a second path 306. The second path 306 may allow air to enter the air scoop assembly 201 through a second inlet 246 defined between the outer panel 210, the first baffle wall 216, and the second baffle wall 232 (or the side panel 206 when there is not a second baffle 230). The second path 306 may provide a flow path with the greatest flow rate into the cooling orifice 224. In other words, the second inlet 246 may be the largest inlet of the air scoop assembly 201 and thereby provide the greatest flow rate into the cooling orifice 224.

The size of the second inlet 246 may vary for different embodiments considered herein. More specifically, FIG. 2b illustrates a cutout portion 222 that provides an arc-shaped cutout of the outer panel 210. The cutout portion 222 may allow greater fluid flow from the surrounding environment 204 into the cooling orifice 224 through the second inlet 246.

Figure 4A:
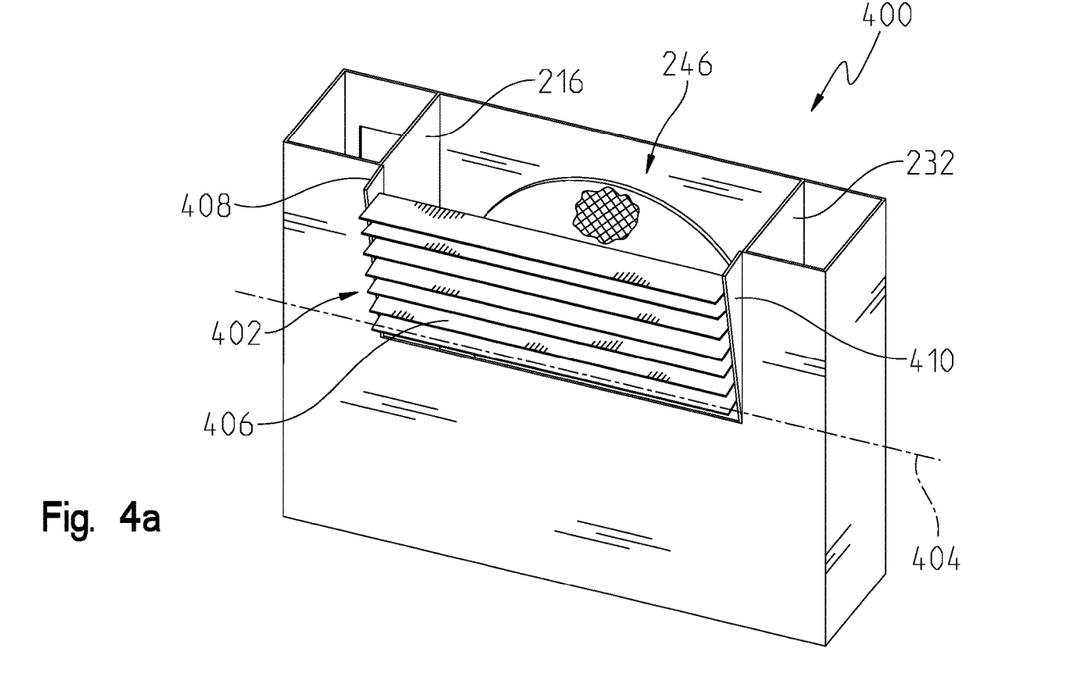
FIG. 4a is an elevated perspective view of another embodiment of an air scoop assembly.
Figure 4B:
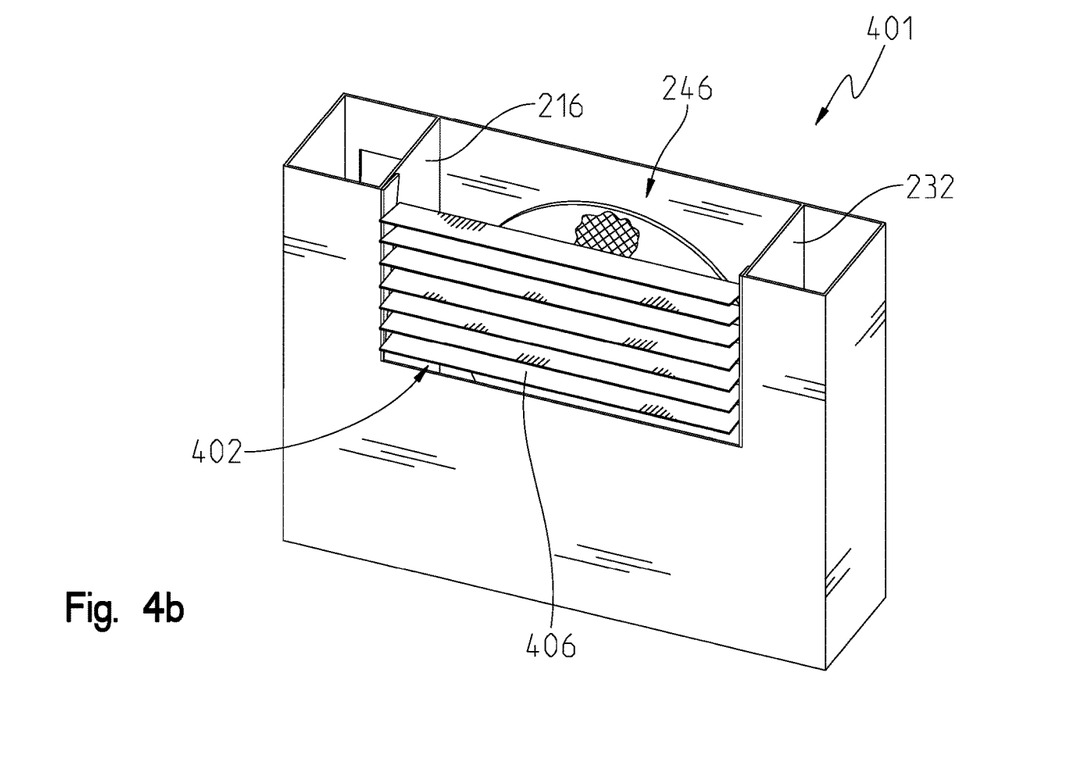
FIG. 4b is an elevated perspective view of the air scoop assembly of FIG. 4a with a louver assembly in a reduced configuration.

Alternatively FIGS. 4a and 4b illustrate another embodiment of this disclosure wherein a louver assembly 402 may be coupled to the outer panel 210 or other member of a corresponding air scoop assembly 400. In the embodiments of FIGS. 4a and 4b, the second inlet 246 may be partially directed through the louver assembly 402. Further still, the louver assembly 402 may be pivotable about an axis 404 to further alter the size of the second inlet 246.

While the second inlet 246 is illustrated herein as being between the first baffle 214 and the second baffle 230, other embodiments may not have a second baffle 230 at all. In these embodiments, the second inlet 246 may be defined by the first baffle wall 216, the outer panel 210, the first panel 202, and the first side panel 206. In this embodiment, the second inlet 246 may be larger than embodiments having a second baffle 230 in a similarly sized air scoop assembly. Accordingly, this disclosure contemplates utilizing only the first baffle 214 wherein air enters the orifice 224 through the first inlet 218 or the second inlet 246.

Figure 5A:
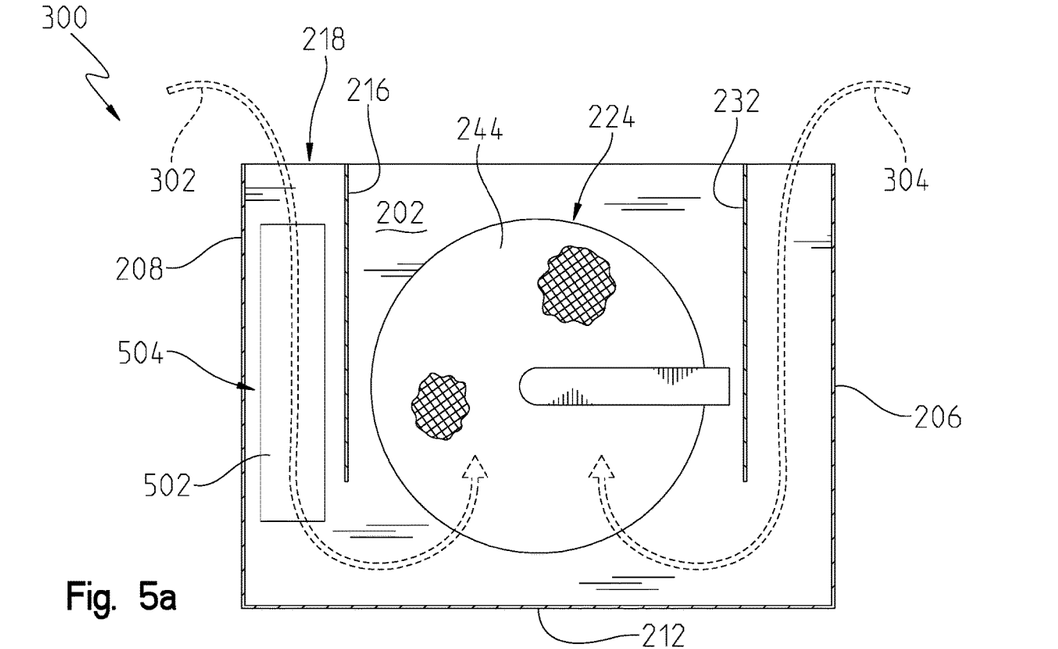
FIG. 5a is a front view of the air scoop assembly of FIG. 3.
Figure 5B:
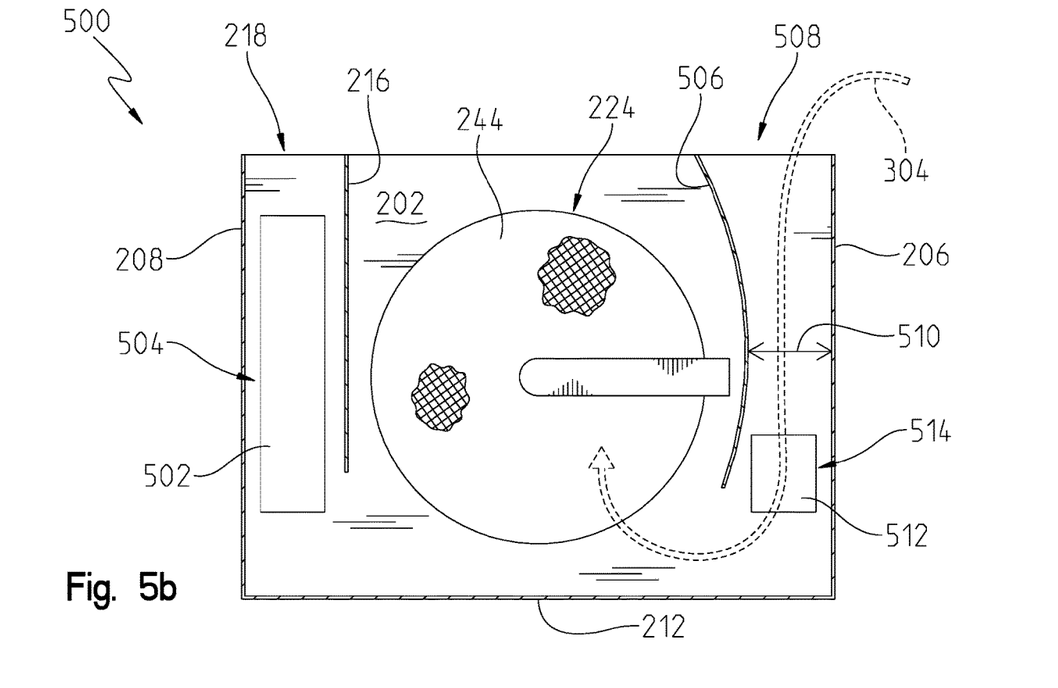
FIG. 5b is a front view of a different embodiment of an air scoop assembly with an outer panel removed.

Referring now to FIGS. 5a and 5b, a fixed screen 502 is illustrated positioned at least partially along the first path 302. The fixed screen 502 may be a filter covering an intake orifice 504 defined in the first panel 202. The intake orifice 504 may be fluidly coupled to an air intake for the internal combustion engine of the engine compartment 24. As is known in the art, the internal combustion engine combines fuel with the surrounding air to initiate a controlled combustion of the mixture. In one aspect of this disclosure, the air required by the internal combustion engine may be obtained through the intake orifice 504.

In one aspect of this disclosure, the first path 302 may be directed at least partially over the fixed screen 502 to remove debris therefrom to ensure adequate air is getting to the engine through the fixed screen 502. As discussed herein, the cooling fan 226 may be drawing air through the orifice 224 along the first path 302. As the air moves along the first path 302, it may pass over the fixed screen 502 and remove at least a portion of the debris positioned thereon. Then, the air may proceed along the first path 302 and through the orifice 224. The rotary screen 244 may capture the debris removed from the fixed screen 502 to be further cleaned and vacuumed therefrom.

While a portion of the air moving along the first path 302 may be drawn into the engine through the intake orifice 504, the flowrate demands of the cooling fan 226 may provide a substantially turbulent flow of fluid across the fixed screen 504 to remove debris therefrom. In other words, while the engine does require air to flow through the intake orifice 504, much more air is passing over the intake orifice 504 and being drawn through the orifice 224 by the cooling fan 226.

In another aspect of this disclosure, the first and second inlets 218, 234 are positioned to be facing substantially in the vertical direction 220. That is to say, the first and second inlets 218, 234 draw air from the surrounding environment at an uppermost portion of the corresponding air scoop assembly. Typically, dirt and debris-laden air which is stirred up by the equipment when in operation will rise to several feet above ground level. By positioning the first and second inlets 218, 234 along a topmost portion of the air scoop assembly, the air which is drawn into the first and second baffles 214, 230 is substantially cleaner relative to air positioned closer to the underlying ground. This in turn reduces the amount of foreign debris which must be screened and filtered from the incoming air through either the fixed screen 502 or the rotary screen 244.

Referring now to FIGS. 4a and 4b, another embodiment of the air scoop assembly 400 is illustrated. In this embodiment of the air scoop assembly 400, the louver assembly 402 may be pivotally coupled to the air scoop assembly 400 between the first and second baffle walls 216, 232. More specifically, the louver assembly 402 may have a plurality of louvers 406 pivotally coupled between a first member 408 and a second member 410. Each of the plurality of louvers 406 may be individually pivotable relative to the first and second members 408, 410 to thereby redirect air entering the air scoop assembly 400 along the second inlet 246. Further, each of the first and second members 408, 410 may be pivotally coupled to the air scoop assembly 400 at one end along the axis 404. Accordingly, the first and second members 408, 410 may be pivoted outwardly about the axis 404 to reposition the plurality of louvers 406 in an enlarged orientation as illustrated in FIG. 4a. Alternatively, the first and second members 408, 410 may be pivoted inwardly about the axis 404 to reposition the plurality of louvers 406 in a reduced orientation 401 as illustrated in FIG. 4b.

Referring now to FIG. 5b, yet another embodiment of an air scoop assembly 500 is illustrated with an outer panel removed. In the embodiment of FIG. 5b, a second baffle wall 506 may be at least partially curved compared to the baffle wall 232 of FIG. 5a. This configuration may provide a comparatively larger inlet 508 while allowing the baffle wall 506 to bypass support structure for the rotary screen 244. Further, a neck 510 may be formed between the baffle wall 506 and the first side panel 206. In one aspect of this embodiment, the neck 510 may cause an accelerated flow velocity along the second baffle as air is drawn along the third path 304.

Further, in one non-exclusive embodiment illustrated in FIG. 5b, a second screen 512 may be defined along the third path 304. The second screen 512 may cover a second orifice 514 defined in the first panel 202. Further, the second orifice 514 may be fluidly coupled to the engine or the engine compartment 24. In the embodiment of FIG. 5b, the neck 510 may provide and increased airflow velocity over the second screen 512 to thereby further dislodge any debris positioned thereon. In other words, the increased airflow created by the neck 510 may dislodge debris and clean the second screen 512 in as similar manner as discussed herein with reference to the fixed screen 502. Further still, in one aspect of this disclosure both the intake orifice 504 and the second orifice 514 may be fluidly coupled to the intake of the engine. In this configuration, if one of the orifices 504, 514 is substantially blocked with debris, the other of the orifices 504, 514 may provide adequate air flow to the engine to allow proper combustion of fuel.

In one aspect of this disclosure, by utilizing a baffle to define a first flow path over a fixed screen in combination with a larger second inlet the cooling package may have adequate airflow to cool the work machine while still providing sufficient turbulence over the fixed screen to clean debris therefrom. In other words, the demands of the cooling package may be met by opening the air hood assembly to the surrounding environment. However, doing so reduces the airflow across any fixed screens positioned therein. By implementing the use of baffles as explained in this disclosure, the cooling package may have access to sufficient air flow rates while the fixed screens are positioned along the baffles to ensure there is sufficient air flow velocity to remove debris there form.

Although the invention is illustrated as being used one type of combine, the present invention can be used on other combine types including conventional straw walker combines and hybrid combines having transverse threshing cylinders and rotary separators among other work machine type altogether.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An air management assembly for a work machine, comprising:
    a cooling orifice defined in a panel;
    a cooling fan generating a cooling airflow from an intake side of the cooling orifice to a cooling package;
    at least one fixed screen positioned along an intake orifice; and
    a first baffle positioned at least partially between the cooling orifice and the intake orifice on the intake side;
    wherein, the first baffle directs the cooling airflow partially across the fixed screen to clear the fixed screen of debris.

2. The air management assembly of claim 1, further wherein the first baffle defines a first inlet and a first outlet, the first inlet being oriented in a substantially vertical direction.

3. The air management assembly of claim 2, further wherein the first outlet directs air towards the cooling orifice.

4. The air management assembly of claim 2, further wherein the fixed screen is at least partially positioned between the first inlet and the first outlet.

5. The air management assembly of claim 2, further comprising a second baffle wherein the second baffle defines a second inlet and a second outlet, the second inlet being oriented in a substantially vertical direction.

6. The air management assembly of claim 1, further comprising a rotary screen substantially covering the cooling orifice and an air scoop that partially directs the cooling airflow into the cooling orifice.

7. The air management assembly of claim 6, further wherein the air scoop has a cutout portion and at least a portion of the rotary screen is not horizontally obstructed by the air scoop from a surrounding environment.

8. The air management assembly of claim 6, further comprising a louver assembly coupled to the air scoop.

9. The air management assembly of claim 8, further wherein the louver assembly is pivotable about a pivot axis.

10. An air management assembly for a work machine, comprising:
    a cooling assembly having a cooling package and defining a cooling orifice, the cooling assembly configured to direct air from a surrounding environment through the cooling orifice to cool the cooling package;
    an air scoop assembly that directs air from the surrounding environment through the cooling orifice;
    a first baffle defined in the air scoop assembly to direct air from the surrounding environment into the cooling orifice along a first path; and
    an intake orifice defined in the air scoop assembly at least partially along the first baffle;
    wherein, air from the surrounding environment enters the cooling orifice along the first path through the first baffle and through a second path that is not through the first baffle.

11. The air management assembly of claim 10, further comprising a screen over the intake orifice, wherein the first path is directed at least partially over the screen to thereby remove debris from the screen as air flows in the first path towards the cooling orifice.

12. The air management assembly of claim 10, further wherein the air scoop assembly further defines a second baffle that provides air flow from the surrounding environment to the cooling orifice along a third path.

13. The air management assembly of claim 12, further comprising a second orifice having a second screen wherein the second orifice and screen are positioned at least partially along the third path.

14. The air management assembly of claim 12, further wherein the first baffle has a first inlet and the second baffle has a second inlet wherein the first and second inlets are substantially facing a vertical direction.

15. The air management assembly of claim 14, further wherein the first baffle has a first outlet and the second baffle has a second outlet, the first and second outlets being defined in a pocket portion of the air scoop assembly.

16. The air management assembly of claim 10, further wherein the air scoop assembly has a louver assembly coupled thereto wherein the louver assembly partially defines the second path.

17. The air management assembly of claim 16, further wherein the louver assembly is pivotable about a pivot axis between a first orientation and a second orientation.

18. A work machine, comprising:
a body;
at least one ground engaging mechanism;
an engine that selectively powers the ground engaging mechanism, the engine fluidly coupled to an engine intake orifice to provide air to the engine to assist with the combustion of fuel;
a radiator fluidly coupled to at least one fluid system of the work machine to cool fluids used by the fluid system;
a cooling fan that draws air from a surrounding environment through a cooling orifice past the radiator;
an air scoop assembly positioned at least partially around the cooling orifice and that directs air from the surrounding environment through the cooling orifice; and
a first baffle defined in the air scoop assembly to direct air from the surrounding environment into the cooling orifice along a first path;
wherein, the engine intake orifice is defined in the air scoop assembly at least partially along the first baffle;
further wherein, the cooling fan draws air from the surrounding environment through the air scoop assembly along the first path through the first baffle and through a second path that is not through the first baffle.

19. The work machine of claim 18, further wherein the air scoop assembly further defines a second baffle that provides air flow from the surrounding environment to the cooling orifice along a third path,
further wherein, the first baffle has a first inlet and the second baffle has a second inlet wherein the first and second inlets are substantially facing a vertical direction.

20. The work machine of claim 19, further wherein the air scoop assembly has a louver assembly coupled thereto and positioned between the first and second baffle, wherein the louver assembly partially defines the second path;
further wherein, the louver assembly is pivotable about a pivot axis between a first orientation and a second orientation.

* * * * *